United States Patent
Chandra et al.

(10) Patent No.: US 10,354,220 B2
(45) Date of Patent: Jul. 16, 2019

(54) RULE BASED SOURCE SEQUENCING FOR ALLOCATION

(71) Applicant: ORACLE INTERNATIONAL CORPORATION, Redwood Shores, CA (US)

(72) Inventors: Somsuvro Chandra, Kolkata (IN); Amy Jane Selby, Falcon Heights, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 123 days.

(21) Appl. No.: 15/368,728

(22) Filed: Dec. 5, 2016

(65) Prior Publication Data
US 2018/0158014 A1  Jun. 7, 2018

(51) Int. Cl.
*G06Q 10/08* (2012.01)
*G06F 16/2455* (2019.01)

(52) U.S. Cl.
CPC ..... *G06Q 10/087* (2013.01); *G06F 16/24564* (2019.01)

(58) Field of Classification Search
CPC .................. G06Q 10/087; G06F 17/30864
See application file for complete search history.

(56) References Cited

U.S. PATENT DOCUMENTS

| | | | | |
|---|---|---|---|---|
| 8,265,986 B2* | 9/2012 | Cheng | ......... | G06Q 10/06 705/13 |
| 8,473,425 B1* | 6/2013 | Maurer | ......... | G06Q 10/083 705/14.42 |
| 8,527,373 B1* | 9/2013 | Ricci | ......... | G06Q 10/087 705/22 |
| 2002/0082954 A1* | 6/2002 | Dunston | ......... | G06Q 10/087 705/28 |
| 2002/0133387 A1* | 9/2002 | Wilson | ......... | G06Q 10/0631 705/338 |
| 2003/0050872 A1* | 3/2003 | Lee | ......... | G06Q 10/087 705/28 |
| 2003/0093388 A1* | 5/2003 | Albright | ......... | G06Q 10/08 705/400 |
| 2004/0260570 A1* | 12/2004 | Dunn | ......... | G06Q 10/087 705/22 |
| 2005/0165629 A1* | 7/2005 | Bruns | ......... | G06Q 10/025 705/6 |

(Continued)

*Primary Examiner* — Nathan A Mitchell
(74) *Attorney, Agent, or Firm* — Kraguljac Law Group, LLC

(57) ABSTRACT

Systems, methods, and other embodiments associated with rule based source sequencing for allocation are described. In one embodiment, a method includes receiving an item request from an entity. The example method may also include executing rules of an allocation sequence rule set upon attributes of warehouses until a target warehouse capable of satisfying the item request is identified. The rules are executed in a sequential order based upon priorities assigned to the rules. The example method may also include generating a set of control instructions within a data structure identifying the target warehouse and the item request. The example method may also include sending the data structure to a remote computer, associated with the target warehouse, for causing the item request to be processed from the target warehouse.

19 Claims, 6 Drawing Sheets

(56) References Cited

U.S. PATENT DOCUMENTS

| | | | | |
|---|---|---|---|---|
| 2005/0216505 | A1* | 9/2005 | Chorley | G06Q 10/06 |
| 2005/0256787 | A1* | 11/2005 | Wadawadigi | G06Q 10/087 |
| | | | | 705/28 |
| 2007/0150382 | A1* | 6/2007 | Danilewitz | G06Q 10/08 |
| | | | | 705/28 |
| 2008/0015943 | A1* | 1/2008 | Kahlon | G06Q 10/08 |
| | | | | 705/22 |
| 2010/0262521 | A1* | 10/2010 | Robinson | G06Q 10/08 |
| | | | | 705/29 |
| 2012/0072431 | A1* | 3/2012 | Berlener | G06Q 10/087 |
| | | | | 707/748 |
| 2014/0012706 | A1* | 1/2014 | Foerster | G06Q 30/04 |
| | | | | 705/26.81 |
| 2016/0034849 | A1* | 2/2016 | Schmid | G06Q 10/083 |
| | | | | 705/334 |
| 2016/0055572 | A1* | 2/2016 | Chen | G06Q 30/0635 |
| | | | | 705/26.81 |
| 2017/0236083 | A1* | 8/2017 | Granero | G06Q 10/06315 |
| | | | | 705/7.25 |
| 2017/0293881 | A1* | 10/2017 | Narkulla | G06Q 10/087 |

* cited by examiner

| WAREHOUSE | BUSINESS ENTITY | DISTRIBUTION CHANNEL | PROTECTED STATUS | PRIMARY STATUS | QUANTITY |
|---|---|---|---|---|---|
| WAREHOUSE (1) | US ORGANIC STORE | STORES | NO | NO | 450 |
| WAREHOUSE (2) | CHINA ORGANIC STORE | ECOMMERCE | NO | YES | 300 |
| WAREHOUSE (3) | US DISCOUNT STORE | STORES | YES | NO | 500 |
| WAREHOUSE (4) | US ORGANIC STORE | WHOLESALE | NO | NO | 120 |

WAREHOUSE DATA RECORDS — 108

FIG. 3

RULE DATA STRUCTURE — 110

(ALLOCATION SEQUENCE RULE SET) — 112

| RULES | CRITERION (1) BUSINESS ENTITY | CRITERION (2) DISTRIBUTION CHANNEL | CRITERION (3) PROTECTED STATUS | CRITERION (4) PRIMARY STATUS |
|---|---|---|---|---|
| R (1A) | SOURCE FROM DEFAULT PRIMARY FOR ITEM/ENTITY ||||
| R (1B) | SOURCE FROM DEFAULT PRIMARY FOR ENTITY ||||
| R (2A) | Y | Y | N | Y |
| R (2B) | Y | Y | N | N |
| R (2C) | Y | Y | Y | Y |
| R (2D) | Y | Y | Y | N |
| R (3A) | Y | N | N | Y |
| R (3B) | Y | N | N | N |
| R (3C) | Y | N | Y | Y |
| R (3D) | Y | N | Y | N |
| R (4A) | N | N | N | Y |
| R (4B) | N | N | N | N |
| R (4C) | N | N | Y | Y |
| R (4D) | N | N | Y | N |

FIG. 4

RULE BASED SOURCE SEQUENCING FOR ALLOCATION

BACKGROUND

Many retailers and other entities store inventory within warehouses. For example, a retailer stores inventory within hundreds of warehouses that are used to supply such inventory to thousands of brick and mortar stores, to outlets, to wholesalers, for ecommerce order fulfillment, and/or other local or global channels. An inventory allocator is employed by the retailer to track and manage the flow of inventory, such as into warehouses, from warehouses to stores, from warehouses and stores to consumers, etc. The retailers usually specify a default supply chain of warehouses for a set of stores, such that the set of stores is always sourced from the same warehouses.

Some systems allow the default supply chain to be bypassed so that inventory can be arbitrarily sourced from any warehouse that has available units of the required items. Unfortunately, fulfilling item requests from any warehouse without further considerations results in inefficient sourcing of inventory. For example, it is inefficient for a retail store in Texas to pull inventory from a warehouse in Toronto, even though the Toronto warehouse has adequate inventory, because of cost, time, and import/export implications. Thus, arbitrarily selecting any warehouse with available inventory does not scale well for large retail implementations, such as where items are sold in multiple countries, through different business entities/brands/banners (e.g., a retailer sells adult clothing through a first retail brand, children's clothing through a third retail brand, etc.), and through multiple channels such as wholesalers, retail stores, ecommerce, franchises, etc.

The inventory allocator could often lack awareness of the implication of selecting inventory from different business entities and channels of the retailer. Inefficient sourcing of inventory leads to inventory imbalances across stores and channels, which leads to an increase of product markdown and disappointed customers. It also leads to increased cost, time to fulfill item requests, and potential import/export implications.

Without the ability to identify efficient warehouses for sourcing inventory, a retailer is left to manually evaluate large numbers of warehouses from which to source inventory. Processing and storage resources are wasted in creating hundreds of warehouse sourcing options for the retailer to manually consider. For example, there may be hundreds of warehouses or combinations of warehouses that have available inventory for satisfying an item request. Such resources are wasted on creating warehouse sourcing options that will not be used because the retailer will only select a single warehouse or a single sequence of warehouses if the single warehouse does not have enough inventory to satisfy an item request.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates one embodiment of warehouse data records.

FIG. 4 illustrates one embodiment of a rule data structure.

DETAILED DESCRIPTION

Figure 1:
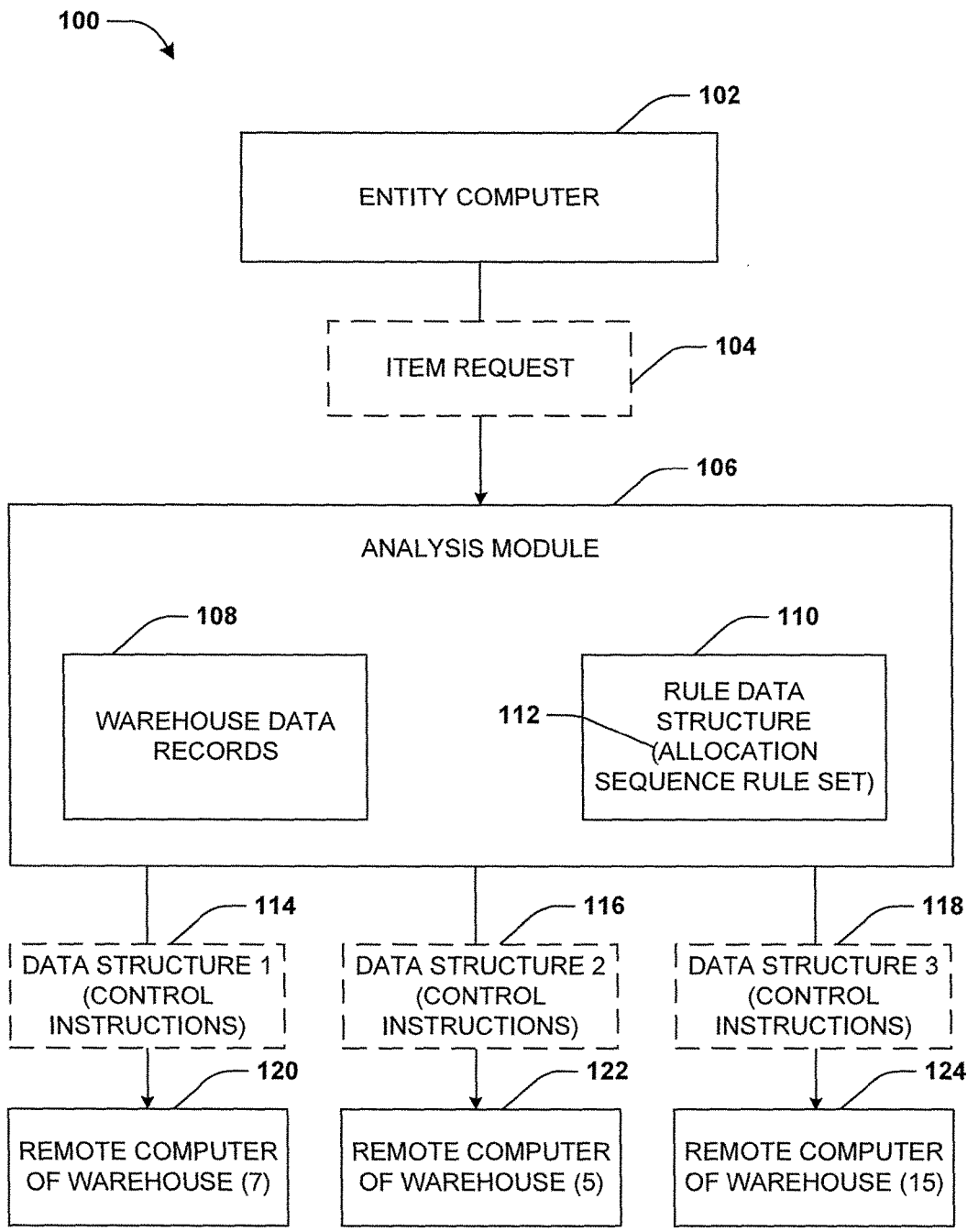
FIG. 1 illustrates an embodiment of a system associated with rule based source sequencing for allocation.

Computerized systems and methods are described herein that provide for rule based source sequencing for allocation. In one embodiment, a system is described that is configured to intelligently select one or more warehouses for satisfying an item request based a set of rules. The set of rules are executed in a sequential order of priority to select a target warehouse to use beyond a default warehouse. For example, an allocation sequence rule set is constructed with rules that are sequentially executed based upon priorities assigned to each rule. For example, a highest priority rule is executed first in an attempt to identify a warehouse that has attributes matching the criteria of the highest priority rule (e.g., a warehouse with attributes that have a highest priority/rank). If the highest priority rule does not identify any warehouses, then a second highest priority rule is executed next in an attempt to identify a warehouse that has attributes matching the criteria of the second highest priority rule (e.g., a warehouse with attributes that have a next highest priority/rank). In this way, the rules are executed in the sequential order until the target warehouse is identified.

In an example, a target warehouse is selected that is more cost effective, is within the same business entity as the entity that submitted the item request, is within a same channel as the entity, will decrease shipping time, etc. In an example, the set of rules are executed in a sequential order where higher priority rules are executed before lower priority rules. The set of rules are executed in order to identify the target warehouse, with the item, that matches the criteria of a rule. Processing resources and storage space is conserved because once a rule has identified the target warehouse (e.g., one or more rules have identified a sequence of target warehouses with an adequate amount of the item to fulfill the item request), no further rules are executed.

The allocation sequence rule set can scale to large implementations, such as multi-channel retailers, such as a retailer that sells through stores, ecommerce, wholesalers, outlets, etc. The allocation sequence rule set can scale to global retailers and/or multi-business entity retailers, such as a retailer that sells items under various banners or legal entities and/or in multiple countries. The allocation sequence rule set is scalable because various criteria are used to assign priority weights to attributes of warehouses in order to identify a target warehouse without wasting processing and storage resources otherwise used for creating and storage a plurality of potential warehouse sourcing options. Otherwise, creating a large permutation of warehouse sourcing options would require the creation of more data, more queries to warehouse data records, and the creation of reports for manual analysis and evaluation.

Manual evaluation of the reports of candidate warehouses is costly, waste considerable amounts of time, and lead to inefficient warehouse selection due to human error and oversight. For example, hundreds or thousands of warehouse candidates or sequences of warehouse candidates must be manually reviewed for selection. Accordingly, as provided herein, a single efficient suggestion is provided without wasted computing resources and/or manual evaluation that otherwise could lead to inefficient sourcing.

In one embodiment, the allocation sequence rule set executes rules, used to determine target warehouses for satisfying item requests, in sequential order from a highest priority rule to a lowest priority rule. The sequential execution of the rules is terminated when one or more target warehouses capable of fully satisfying the item request are identified. For example, the one or more target warehouses are identified after execution of a first rule, a second rule, and a third rule, thus reducing processing and memory resource consumption otherwise used to execute further lower priority rules.

With reference to FIG. 1, one embodiment of a system 100 associated with rule based source sequencing for allocation is illustrated. The system 100 includes an analysis module 106, which is configured to execute on a computer, such as computer 606 of FIG. 6. The analysis module 106 is initiated based upon an item request 104 being received from an entity computer 102, such as a computer of a retail store that is requesting 90 white dress shirts for in-store stock replenishment. For example, the analysis module 106 receives the item request 102 as data 604 received over a network. The analysis module 106 utilizes a processor 608, memory 614, input/output (I/O) controllers 612, input/output (I/O) interfaces 616, and/or input/output (I/O) ports 618 accessible over a bus 610 of the computer 606 for execution and analysis of warehouse data records 108 for identification of a target warehouse that can satisfy the item request 104. The warehouse data records 108 are stored within disks 624 or within other network devices 620.

The analysis module 106 utilizes a rule data structure 110, further illustrated and described in FIG. 4, including an allocation sequence rule set 112 for assigning priority weights to attributes, of a plurality of warehouses 302, within warehouse data records 108, further illustrated and described in FIG. 3, for identification of the target warehouse. A target warehouse includes a physical warehouse, one or more virtual warehouses such as groupings of inventory within a signal physical warehouse, etc. In an example, rules within the allocation sequence rule set are executed in a sequential order based upon priorities of such rules until a target warehouse is identified. Once the target warehouse is identified, the execution of the rules is terminated.

Figure 6:
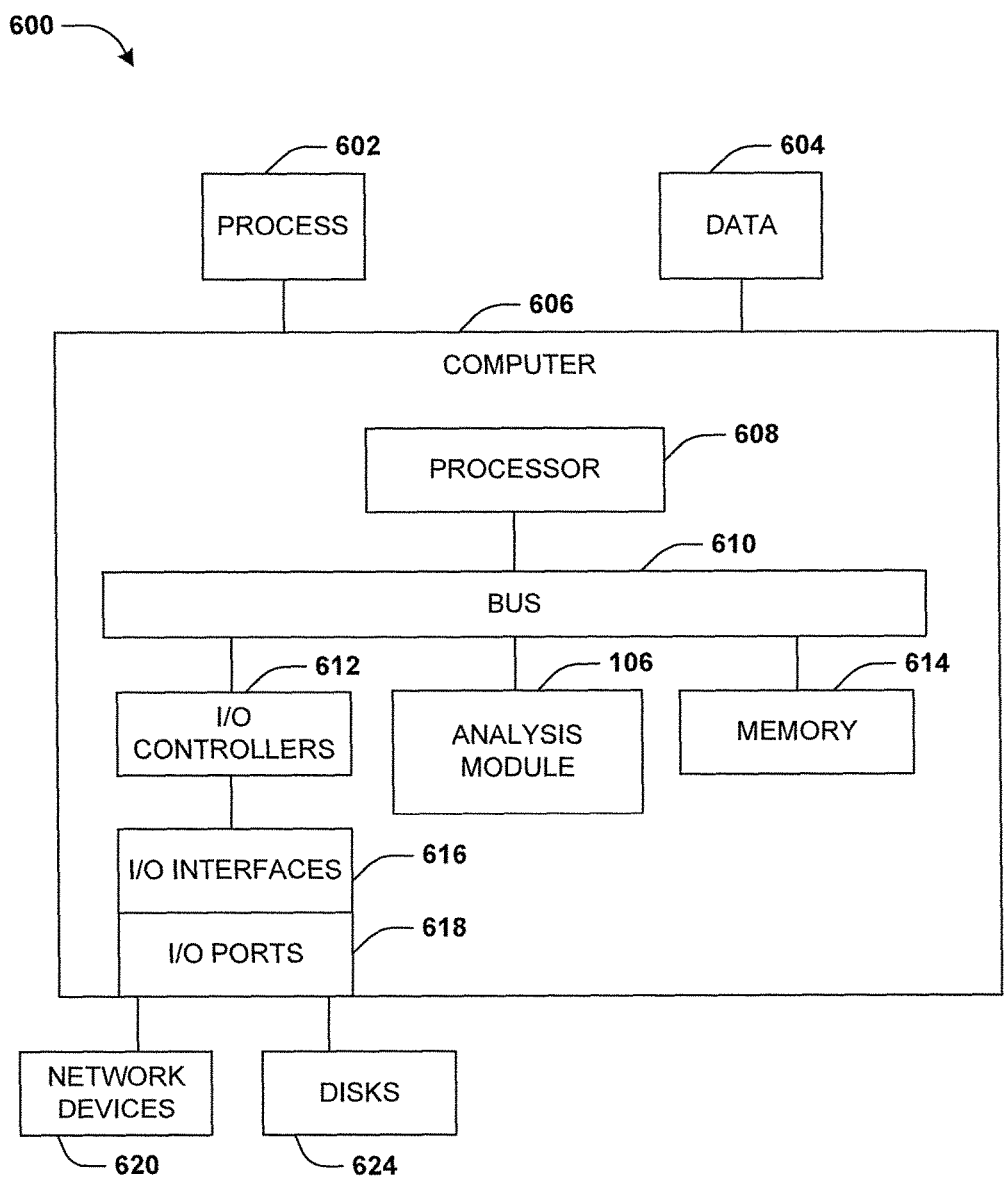
FIG. 6 illustrates an embodiment of a computing system configured with the example systems and/or methods disclosed.

In one embodiment, the warehouse data records 108 include a list, a database, a table, or any other data structure of warehouse identifiers and attributes, which is stored within the disks 624 and/or network devices 620 accessible to the analysis module 106 using the I/O controllers 612, I/O interfaces 616, and/or I/O ports 618 of FIG. 6. In particular, the warehouse data records 108 are analyzed, such as queried based upon an item identifier of an item (e.g., the white dress shirts) requested by the item request 104 in order to identify the plurality of warehouses 302 that stock the item.

In one embodiment of assigning priority weights to attributes, first priority weights are assigned to business entity attributes 304, within the warehouse data records 108, regarding whether each of the warehouses and the entity are within a same business entity or different business entities. A first criterion 406 within the allocation sequence rule set 112 assigns the first priority weights to the business entity attributes 304, where warehouses within the same business entity are preferred over warehouses within a different business entity than the destination entity. For example, a clothing retailer prefers to send white dress shirts from a warehouse that operates under a same banner as the entity. When fulfilling a request from Clothing Store of America, the clothing retailer prefers to send white dress shirts from a warehouse associated with the Clothing Store of America as opposed to other retail operations of the clothing retailer such as warehouses associated with Kids Clothing Store of America or Clothing Store of South Africa that are also affiliated with or owned by the clothing retailer.

In one embodiment, second priority weights are assigned to distribution channel attributes 306, within the warehouse data records 108, regarding whether each of the warehouses and the entity are within the same distribution channel or different distribution channels. A second criterion 408 within the allocation sequence rule set 112 assigns the second priority weights to the distribution channel attributes 306, where warehouses within the same distribution channel are preferred over warehouses within different distribution channels than the entity. For example where the entity is fulfilling an order for an ecommerce customer, the clothing retailer prefers to send the white dress shirts from a warehouse that is associated with ecommerce as opposed to warehouses that are associated with brick and mortar retail stores of the clothing retailer.

In one embodiment, third priority weights are assigned to protect attributes 308, within the warehouse data records 108, regarding whether each of the warehouses are marked as protected. Inventory within a protected warehouse are marked/reserved for a particular event or for other reasons, and thus sending items from the protected warehouse interferes with the event. A third criterion 410 within the allocation sequence rule set 112 assigns the third priority weights to the protected attributes 308, where warehouses that are marked as unprotected are preferred over warehouses that are marked as protected.

In one embodiment, fourth priority weights are assigned to primary warehouse attributes 310, within the warehouse data records 108, regarding whether each of the warehouses are marked as primary. Primary warehouses that are preferred by the clothing retailer for fulfilling item requests are marked as primary, such as at a store level granularity or a zone fulfillment granularity (e.g., a primary zone is defined as warehouses within 3 west coast states). A fourth criterion 412 within the allocation sequence rule set 112 assigns the fourth priority weights to the primary warehouse attributes 310, where warehouses that are marked as primary are preferred over warehouses that are marked as non-primary.

In one embodiment, the first criterion 406 assigns the first priority weights that are weighted more than the second priority weights assigned by the second criterion 408, the third priority weights assigned by the third criterion 410, and the fourth priority weights assigned by the fourth criterion 412. Selecting warehouses within a same business entity is a more important consideration than warehouses that are within a same channel, are unprotected, and/or are primary.

The second criterion 408 assigns the second priority weights that are weighted more than the third priority weights assigned by the third criterion 410 and the fourth priority weights assigned by the fourth criterion 412. Selecting warehouses within a same channel is a more important consideration than warehouses that are unprotected and/or are primary.

The third criterion 410 assigns the third priority weights that are weighted more than the fourth priority weights assigned by the fourth criterion 412. Selecting warehouses that are unprotected is a more important consideration than warehouses that are primary.

It is appreciated that the allocation sequence rule set 112 utilizes a variety of criteria. One criterion assigns priority weights to proximity attributes of distances between warehouses and entities based upon a preference to ship from warehouses that are closer to the entity.

Another criterion assigns priority weights to item pricing attributes for items within warehouses and/or items sold through entities. The priority weights are assigned based upon a preference to send inventory to a retail store that is selling the inventory at a higher price than a markdown price at an outlet store to which the inventory was initially marked/reserved for sale through.

Another criterion assigns priority weights to delivery timeframe attributes of estimated delivery times of shipping items from warehouses to entities. The priority weights are assigned based upon historic shipping time data, populated within the warehouse data records 108, of a warehouse. The historic shipping time data is used to determine an estimated delivery timeframe, such as an amount of time for the item to reach the entity from the warehouse.

Another criterion assigns priority weights to delivery cost attributes for shipping items from warehouses to entities. The priority weights are assigned based upon historic shipping cost data, populated within the warehouse data records 108, of a warehouse. The historic shipping cost data is used to determine a delivery cost to ship the item to the entity.

Another criterion assigns priority weights to warehouse operational status attributes corresponding to abnormal operating states of warehouses. The priority weights are assigned based upon operating states of warehouses populated within the warehouse data records, such as an alert of an equipment failure, a worker strike, a temporary shutdown of a warehouse, the warehouse being behind schedule, etc.

In this way, target warehouse(s) are selected from the plurality of warehouses (e.g., a sequence of 3 warehouses that will cumulatively have enough white dress shirts to satisfy the item request 104) based at least in part on the target warehouse(s) having assigned priority weights exceeding a threshold. For example, the threshold corresponds to a highest cumulative priority weight assigned by the allocation sequence rule set 112. For example, a warehouse (7) has a highest priority weight, and thus 20 of the 20 available white dress shirts are selected first for use in fulfilling the item request 104 for the 90 white dress shirts. A warehouse (5) has a second highest priority weight, and thus 65 of the 65 available white dress shirts are selected second for use in fulfilling the item request 104 for the 90 white dress shirts. A warehouse (15) has a third highest priority weight, and thus 5 of the 200 available white dress shirts are selected third for use in fulfilling the item request 104 for the white dress shirts.

Accordingly, the analysis module 106 generates a first set of control instructions, within a first data structure 114, identifying the warehouse (7), as a first target warehouse, and the item request 104. The first set of control instructions include an instruction to perform inventory processing so that 20 white dress shirts are shipping from the warehouse (7) to the entity. The first data structure 114 is sent to a remote computer 120 associated with warehouse (7) for execution of the first set of control instructions to cause the remote computer 120 to modify an inventory processing data structure for satisfying the item request 104 from the warehouse (7). For example, the first data structure 114 is sent over a network utilizing various networking protocols and/or message/packet formats. The modification to the inventory processing data structure includes the modification of an inventory database of the warehouse (7) indicative of 20 white dress shirts being processed to ship from the warehouse (7) to the entity.

The analysis module 106 generates a second set of control instructions, within a second data structure 116, identifying the warehouse (5), as a second target warehouse, and the item request 104. The second set of control instructions include an instruction to perform inventory processing so that 65 white dress shirts are shipping from the warehouse (5) to the entity. The second data structure 116 is sent to a remote computer 122 associated with warehouse (5) for execution of the second set of control instructions to cause the remote computer 122 to modify a second inventory processing data structure. The modification to the second inventory processing data structure includes the modification of a second inventory database of the warehouse (5) indicative of 65 white dress shirts being processed to ship from the warehouse (5) to the entity for satisfying the item request 104 from the warehouse (5). For example, the second data structure 116 is sent over a network utilizing various networking protocols and/or message/packet formats.

The analysis module 106 generates a third set of control instructions, within a third data structure 118, identifying the warehouse (15), as a third target warehouse, and the item request 104. The third set of control instructions includes an instruction to perform inventory processing so that 5 white dress shirts are shipping from the warehouse (15) to the entity. The third data structure 118 is sent to a remote computer 124 associated with warehouse (15), for execution of the third set of control instructions to cause the remote computer 124 to modify a third inventory processing data structure. The modification to the third inventory processing data structure includes the modification of a third inventory database of the warehouse (15) indicative of 5 white dress shirts being processed to ship from the warehouse (15) to the entity for satisfying the item request 104 from the warehouse (15). For example, the third data structure 118 is sent over a network utilizing various networking protocols and/or message/packet formats.

In an example, the warehouse (7), the warehouse (5), and the warehouse (15) may be different physical warehouses or may be virtual warehouses partitioned within a physical warehouse. For example, the warehouse (7) includes a first physical warehouse, warehouse (5) is one of many virtual warehouses within a second physical warehouse, and warehouse 15 is one of many virtual warehouses within the second physical warehouse or a different physical warehouse.

Figure 2:
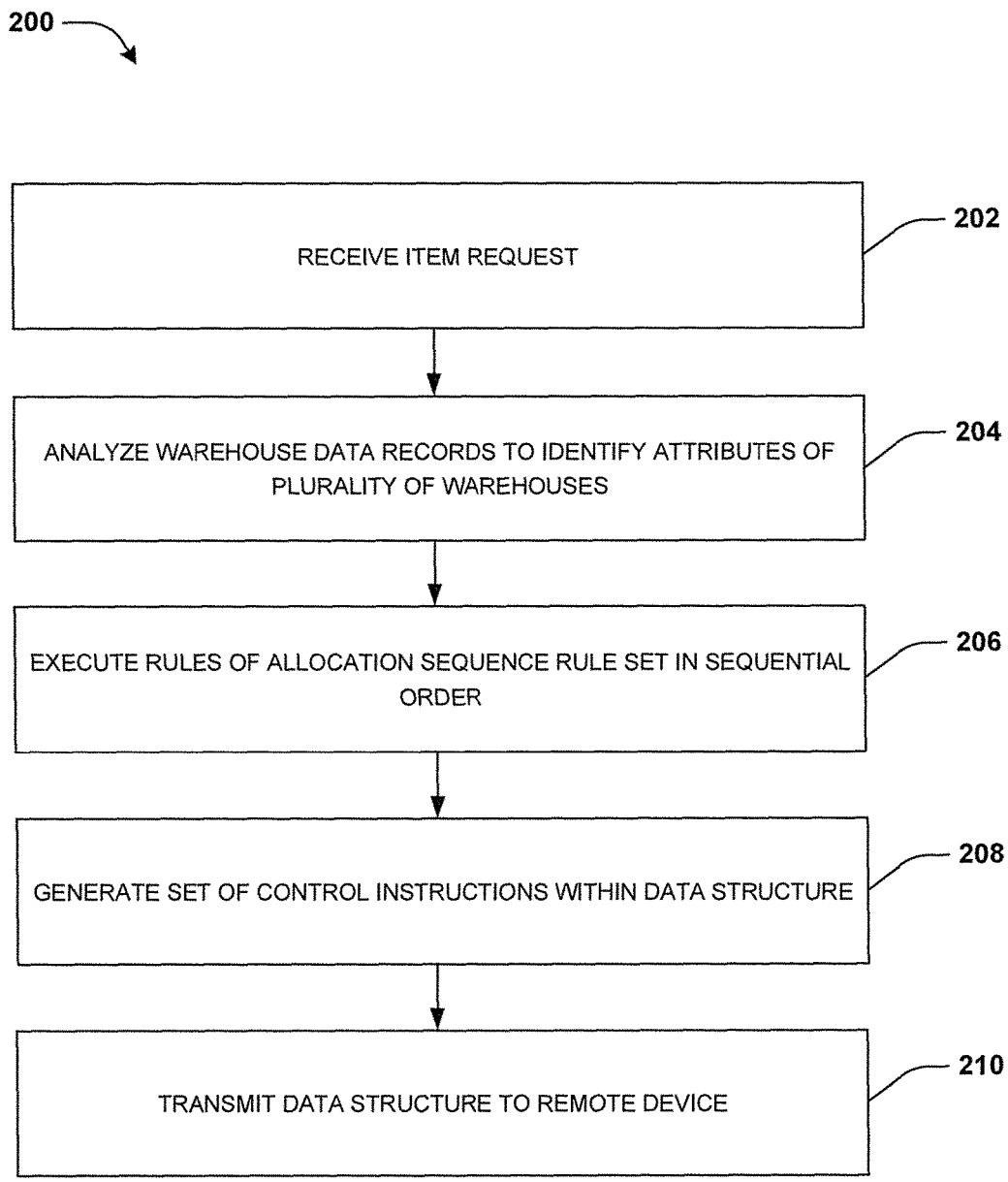
FIG. 2 illustrates one embodiment of a method associated with rule based source sequencing for allocation.

With reference to FIG. 2, one embodiment of a method 200 associated with rule based source sequencing for allocation is illustrated. The method 200 is performed by the analysis module 106 utilizing various computing resources of the computer 606, such as the processor 608 for executing instructions within the allocation sequence rule set 112 for assigning priority weights to attributes within warehouse data records 108, memory 614 and/or disks 624 for storing data structures within which control instructions are generated, and/or network hardware for transmitting data structures to remote computers over networks. The method 200 is triggered based upon various triggers, such as receipt of a request to construct the allocation sequence rule set 112, receipt of the item request 104 from the entity computer 102, etc.

The allocation sequence rule set 112 is constructed within the rule data structure 110 (e.g., stored within memory 614 and/or disks 624), as illustrated in FIG. 4. The allocation sequence rule set 112 includes instructions (e.g., computer executable instructions that are executed by the processor 608) for selecting warehouses to satisfy item requests based upon a plurality of criteria. The instructions include rules 404 that utilize the plurality of criteria for selecting target warehouse(s) for satisfying an item request. In an example, the rules 404 are executed in a sequential order based upon priorities of such rules until a target warehouse is identified. The rules 404 are executed starting with rule (1A) 414, having a highest priority, to rule (4D) 404 having a lowest priority). Once the target warehouse is identified, the execution of the rules 404 is terminated.

In an example, the plurality of criteria include the first criterion 406 that assigns priority weights to the business entity attributes 304, within the warehouse data records 108, regarding whether warehouses and entities are within a same business entity or different business entities. In particular, the first criterion 406 is used to assign higher priority weight to a first warehouse, having a same business entity attribute indicative of the first warehouse being within the same business entity as the entity, than a second warehouse having a different business entity attribute indicative of the second warehouse being within a different business entity than the entity. In this way, warehouses that are within the same business entity as the destination entity are preferred over warehouses that are within different business entities than the entity. For example, a fashion retailer operates stores that are associated with different countries, banners, business units, board units, or legal entities, such that transferring inventory between different business entities results in various cost, efficiency, and overhead implications.

The plurality of criteria include the second criterion 408 that assigns priority weights to the distribution channel attributes 306, within the warehouse data records 108, regarding whether warehouses and entities are within a same distribution channel or different distribution channels. In particular, the second criterion 408 is used to assign higher priority weight to a first warehouse, having a same distribution channel attribute indicative of the first warehouse being within the same distribution channel as the entity, than a second warehouse having a different distribution channel attribute indicative of the second warehouse being within a different distribution channel than the entity. In this way, warehouses that are within the same distribution channel as the entity are preferred over warehouses that are within different distribution channels than the entity. For example, the fashion retailer operates through brick and mortar stores, wholesalers, ecommerce, and/or other distribution channels, such that transferring inventory between warehouses and entities having different distribution channels result in various cost, efficiency, and overhead implications.

The plurality of criteria include the third criterion 410 that assigns priority weights to the protected attributes 308, within the warehouse data records 108, regarding whether warehouses have a protected status or an unprotected status. In particular, the third criterion 410 is used to assign higher priority weight to a first warehouse having the unprotected status than a second warehouse having the protected status. For example, a warehouse has protected inventory that is marked/reserved for a special event or other purpose, such that using the inventory for another purpose has a negative impact on the special event or other purpose.

The plurality of criteria include the fourth criterion 412 that assigns priority weights to primary warehouse attributes 310, within the warehouse data records 108, regarding whether warehouses have a primary status or a non-primary status. In particular, the fourth criterion 412 is used to assign higher priority weight to a first warehouse having the primary status than a second warehouse having the non-primary status. For example, a retailer designates certain warehouses as primary warehouses (e.g., warehouses within a primary zone such as within west coast zone) that are preferred for sourcing inventory to certain stores than other warehouses.

The first criterion 406 is used by the rules 404 to assign a higher priority weight (e.g., a larger weighting factor) to business entity attributes than priority weights assigned by the second criterion 408, the third criterion 410, and/or the fourth criterion 412. A higher priority weight is assigned because sourcing inventory from a warehouse that is part of a same business entity as the entity is a more important consideration than souring inventory from a primary non-protected warehouse within a same channel as the entity.

The second criterion 408 is used by the rules 404 to assign a higher priority weight (e.g., a larger weighting factor) to distribution channel attributes than priority weights assigned by the third criterion 410 and/or the fourth criterion 412. A higher priority weight is assigned because sourcing inventory from a warehouse that is part of a same distribution channel as the entity is a more important consideration than souring inventory from a primary non-protected warehouse.

The third criterion 410 is used by the rules 404 to assign a higher priority weight (e.g., a larger weighting factor) to protected attributes than priority weights assigned by the fourth criterion 412. A higher priority weight is assigned because sourcing inventory from an unprotected warehouse is a more important consideration than souring inventory from a primary warehouse.

In an example of constructing the rules 404, priorities are assigned to rules. For example, rule (1A) 414 has a first priority, rule (1B) 416 has a second priority less than the first priority, rule (2A) 418 has a third priority less than the second priority, rule (2B) 420 has a fourth priority less than the third priority, etc. In this way, the rules 404 are executed in sequential order according to their priority until a warehouse is identified as the target warehouse.

At 202, the item request 104 is received from an entity. For example, the item request 104 is a request for 800 boxes of chocolate cereal from an Organic Store operated by a grocery retailer that operates through an Organic Store legal entity and business unit, a Discount Store legal entity and business unit, legal entities and business units in the United States and China, through ecommerce, wholesalers, brick and mortar stores, etc. In an example, the analysis module 106 receives the item request 104 from the entity computer 102 over a network using network communication functionality of the computer 606. In response to receiving the item request 104, a target warehouse (e.g., or one or more target warehouses if the target warehouse does not have enough boxes of chocolate cereal to fully satisfy the item request 104) is determined, from the plurality of warehouses 302, to assign to the item request 104 for fulfillment.

At 204, the warehouse data records 108, associated with the plurality of warehouses 302, are analyzed to identify attributes from each warehouse, such as business entity attributes 304, distribution channel attributes 306, protected attributes 308, primary warehouse attributes 310, inventory quantity attributes 312, and/or other attributes such as proximity attributes, item pricing attributes, delivery timeframe attributes, delivery cost attributes, warehouse operational status attributes, etc. For example, a first warehouse has a first business entity attribute indicating that the first warehouse is associated with a United States Organic Store business unit. The first warehouse has a first distribution channel attribute indicating that the first warehouse is associated with a brick and mortar store distribution channel. The first warehouse has a first protected attribute indicating that the first warehouse has an unprotected status. The first warehouse has a first primary warehouse attribute indicating that the first warehouse is not a primary warehouse. The first warehouse has a first quantity attribute indicating that the first warehouse has 450 boxes of chocolate cereal.

A second warehouse has a second business entity attribute indicating that the second warehouse is associated with a China Organic Store business unit. The second warehouse has a second distribution channel attribute indicating that the second warehouse is associated with an ecommerce distribution channel. The second warehouse has a second protected attribute indicating that the second warehouse has an unprotected status. The second warehouse has a second primary warehouse attribute indicating that the second warehouse is a primary warehouse. The second warehouse has a second quantity attribute indicating that the second warehouse has 300 boxes of chocolate cereal.

A third warehouse has a third business entity attribute indicating that the third warehouse is associated with a United States Discount Store business unit. The third warehouse has a third distribution channel attribute indicating that the third warehouse is associated with the brick and mortar distribution channel. The third warehouse has a third protected attribute indicating that the third warehouse has a protected status. The third warehouse has a third primary warehouse attribute indicating that the third warehouse is a non-primary warehouse. The third warehouse has a third quantity attribute indicating that the third warehouse has 500 boxes of chocolate cereal.

A fourth warehouse has a fourth business entity attribute indicating that the fourth warehouse is associated with the United States Organic Store business unit. The fourth warehouse has a fourth distribution channel attribute indicating that the fourth warehouse is associated with a wholesaler distribution channel. The fourth warehouse has a fourth protected attribute indicating that the fourth warehouse has an unprotected status. The fourth warehouse has a fourth primary warehouse attribute indicating that the fourth warehouse is a non-primary warehouse. The fourth warehouse has a fourth quantity attribute indicating that the fourth warehouse has 120 boxes of chocolate cereal.

At 206, rules of the allocation rule set are executed in a sequential order for identifying the target warehouse. In an example, priority weights are assigned to the attributes of the plurality of warehouses 302 using the plurality of criteria from the allocation sequence rule set 112. For example, the plurality of criteria is implemented as rules 404 that evaluate the attributes of the plurality of warehouses 302. The rules 404 are executed in a sequential order, based upon priorities assigned to each rule, until one or more target warehouses with enough items to satisfy the item request 104 are determined. The priority of a rule determines an execution position of the rule in the sequential order where the highest priority rules are executed first. In one embodiment, the rules are executed one-by-one in an iterative process according to the sequential order until a best matching warehouse (target) is found from the plurality of warehouses. Upon determining the target warehouse(s), the execution of the sequential order of the rules 404 is terminated to conserve processing and memory resources otherwise used to continue executing further lower priority rules.

In an example, a rule (1A) 414 is executed first to assign a first default priority weight (e.g., with a largest priority weighting value) to a default primary warehouse for an item and entity combination of the entity and an item requested by the item request. For example, the rule (1A) 414 has a highest priority for execution and thus is first in the sequential order. The criteria of the rule (1A) 414 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there is no default primary warehouse or the default primary warehouse does not have enough boxes of chocolate cereal to fulfill the item request 104, then the process repeats by executing the second rule in the sequential order. In this example, a rule (1B) 416 is executed next based upon the rule (1B) 416 having a next highest priority for execution and is thus the second rule in the sequential order. The rule (1B) 416 is executed second to assign a second default priority weight (e.g., with a second largest priority weighting) to a default entity primary warehouse for the entity. The criteria of the second rule are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there is no default entity primary warehouse or the default entity primary warehouse does not have enough boxes of chocolate cereal to fulfill any remaining portion of the item request 104, then a rule (2A) 418 is executed next based upon the rule (2A) 418 having a next highest priority for execution in the sequential order. The rule (2A) 418 assigns a first priority weight (e.g., with a third largest priority weighting value) to warehouses with a same business entity attribute, a same distribution channel attribute, an unprotected status attribute, and a primary status attribute. The first priority weight is assigned because it is more desirable to source from warehouses that are within the same business entity, within the same distribution channel, are not protected, and are primary. The criteria of rule (2A) 418 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (2A) 418 or matching target warehouses do not have enough boxes of chocolate cereal to fulfill any remaining portion of the item request 104, then a rule (2B) 420 is executed next based upon the rule (2B) 420 having a next highest priority for execution. The rule (2B) 420 assigns a second priority weight (e.g., with a fourth largest priority weighting value) to warehouses with a same business entity attribute, a same distribution channel attribute, an unprotected status attribute, and a non-primary status attribute. The second priority weight is assigned because it is more desirable to source from warehouses that are within the same business entity, within the same distribution channel, and are not protected than warehouses that are primary. The criteria of rule (2B) 420 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (2B) 420 or matching target warehouses do not have enough boxes of chocolate cereal to fulfill any remaining portion of the item request 104, then a rule (2C) 422 is executed next based upon the rule (2C) 422 having a next highest priority for execution. The rule (2C) 422 assigns a third priority weight (e.g., with a fifth largest priority weighting value) to warehouses with a same business entity attribute, a same distribution channel attribute, a protected status attribute, and a primary status attribute. The third priority weight is assigned because it is more desirable to source from protected warehouses that are within the same business entity and the same distribution channel. The criteria of rule (2C) 422 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (2C) 422 or matching target warehouses do not have enough boxes of chocolate cereal to fulfill any remaining portion of the item request 104, then a rule (2D) 424 is executed next based upon the rule (2D) 424 having a next highest priority for execution. The rule (2D) 424 assigns a fourth priority weight (e.g., with a sixth largest priority weighting value) to warehouses with a same business entity attribute, a same distribution channel attribute, a protected status attribute, and a non-primary status attribute. The fourth priority weight is assigned because it is more desirable to source from warehouses that are within the same business entity and the same distribution channel than warehouses that are unprotected or primary in another distribution channel or business entity. The criteria of rule (2D) 424 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (2D) 424 or matching target warehouses do not have enough boxes of chocolate cereal to fulfill any remaining portion of the item request 104, then a rule (3A) 426 is executed next based upon the rule (3A) 426 having a next highest priority for execution. The rule (3A) 426 assigns a fifth priority weight (e.g., with a seventh largest priority weighting value) to warehouses with a same business entity attribute, a different distribution channel attribute, an unprotected status attribute, and a primary status attribute. The fifth priority weight is assigned because it is more desirable to source from unprotected and primary warehouses that are within a same business entity and a different distribution channel than warehouses within a different business entity and a same distribution channel as the entity. The criteria of rule (3A) 426 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (3A) 426 or matching target warehouses do not have enough boxes of chocolate cereal to fulfill any remaining portion of the item request 104, then a rule (3B) 428 is executed next based upon the rule (3B) 428 having a next highest priority for execution. The rule (3B) 428 assigns a sixth priority weight (e.g., with an eighth largest priority weighting value) to warehouses with a same business entity attribute, a different distribution channel attribute, an unprotected status attribute, and a non-primary status attribute. The sixth priority weight is assigned because it is more desirable to source from unprotected and non-primary warehouses that are within a same business entity and a different distribution channel than warehouses within a different business entity and a same distribution channel as the entity. The criteria of rule (3B) 428 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (3B) 428 or matching target warehouses do not have enough boxes of chocolate cereal to fulfill any remaining portion of the item request 104, then a rule (3C) 430 is executed next based upon the rule (3C) 430 having a next highest priority for execution. The rule (3C) 430 assigns a seventh priority weight (e.g., with a ninth largest priority weighting value) to warehouses with a same business entity attribute, a different distribution channel attribute, a protected status attribute, and a primary status attribute. The seventh priority weight is assigned because it is more desirable to source from protected and primary warehouses that are within a same business entity and a different distribution channel than warehouses within a different business entity and a same distribution channel as the entity. The criteria of rule (3C) 430 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (3C) 430 or matching target warehouses do not have enough boxes of chocolate cereal to fulfill any remaining portion of the item request 104, then a rule (3D) 432 is executed next based upon the rule (3D) 432 having a next highest priority for execution. The rule (3D) 432 assigns an eighth priority weight (e.g., with a tenth largest priority weighting value) to warehouses with a same business entity attribute, a different distribution channel attribute, a protected status attribute, and a non-primary status attribute. The eight priority weight is assigned because it is more desirable to source from protected and non-primary warehouses that are within a same business entity and a different distribution channel than warehouses within a different business entity and a same distribution channel as the entity. The criteria of rule (3D) 434 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (3D) 432 or matching target warehouses do not have enough boxes of chocolate cereal to fulfill any remaining portion of the item request 104, then a rule (4A) 434 is executed next based upon the rule (4A) 434 having a next highest priority for execution. The rule (4A) 434 assigns a ninth priority weight (e.g., with an eleventh largest priority weighting) to warehouses with a different business entity attribute, a different distribution channel attribute, an unprotected status attribute, and a primary status attribute. The ninth priority weight is assigned because it is more desirable to source from unprotected and primary warehouses than protected or non-primary warehouses. The criteria of rule (4A) 434 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (4A) 434 or matching target warehouses do not have enough boxes of chocolate cereal to fulfill any remaining portion of the item request 104, then a rule (4B) 436 is executed next based upon the rule (4B) 436 having a next highest priority for execution. The rule (4B) 436 assigns a tenth priority weight (e.g., with a twelfth largest priority weighting value 434) to warehouses with a different business entity attribute, a different distribution channel attribute, an unprotected status attribute, and a non-primary status attribute. The tenth priority weight is assigned because it is more desirable to source from unprotected and non-primary warehouses than protected warehouses. The criteria of rule (4B) 436 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (4B) 436 or matching target warehouses do not have enough boxes of chocolate cereal to fulfill any remaining portion of the item request 104, then a rule (4C) 438 is executed next based upon the rule (4C) 438 having a next highest priority for execution. The rule (4C) 438 assigns an eleventh priority weight (e.g., with a thirteenth largest priority weighting value) to warehouses with a different business entity attribute, a different distribution channel attribute, a protected status attribute, and a primary status attribute. The eleventh priority weight is assigned because it is more desirable to source from primary warehouses than non-primary warehouses. The criteria of rule (4C) 438 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

If there are no target warehouses, with available items, that match the rule (4C) 438 or matching target warehouses do not have enough boxes of chocolate cereal to fulfill any remaining portion of the item request 104, then a rule (4D) 440 is executed next based upon the rule (4D) 440 having a next highest priority for execution. The rule (4D) 440 assigns a twelfth priority weight (e.g., a smallest priority weighting value) to warehouses with a different business entity attribute, a different distribution channel attribute, a protected status attribute, and a non-primary status attribute. The twelfth priority weight is assigned because such warehouses are the least desirable warehouses from which to source. The criteria of rule (4D) 440 are evaluated against the attributes of the plurality of warehouses to determine if a match is found. If a match is found of a warehouse(s) that can satisfy the item request, then the execution of the rules 414 is terminated and the warehouse is identified as the target warehouse. Otherwise, a rule having a next highest priority is executed.

It is appreciated that the rules 404 are executed in sequential order from rule (1A) 414 to rule (4D) 440 based upon priorities of the rules 404. The sequential execution of the rules 404 is terminated when one or more target warehouses capable of fully satisfying the item request 104 are identified. For example, merely rule (1A) 414 through rule (2D) 424 are executed, thus reducing processing and memory resources otherwise used to execute the rule (3A) 426 through the rule (4D) 440.

In this way, one or more target warehouses are determined for satisfying the item request 104 based on the assigned priority weights. For example, the rule (1A) 414 and the rule (1B) 416 determine that there are no matching target warehouses. The rule (2A) 418 determines that a first target warehouse is within a same business entity, within a same distribution channel, is not protected, is a primary warehouse, and has 300 boxes of chocolate cereal. The rule (2B) 420 determines that there are no matching target warehouses. The rule (2C) 422 determines that a second target warehouse is within a same business entity, within a same distribution channel, is protected, is a primary warehouse, and has 400 boxes of chocolate cereal. The rule (2D) 424 determines that there are no matching target warehouses. The rule (3A) 426 determines that a third target warehouse is within a same business entity, within a different distribution channel, is not protected, is a primary warehouse, and has 300 boxes of chocolate cereal.

Accordingly, the first target warehouse (e.g., warehouse (7)), the second target warehouse (e.g., warehouse (5)), and the third target warehouse (e.g., warehouse (15)) are determined for satisfying the item request 104. Because the first target warehouse, the second target warehouse, and the third target warehouse can fully satisfy the item request 104, rule (3B) 428 through rule (4D) 440 are not executed, thus reducing processing and memory resource consumption.

At 208, a first set of control instructions is generated within a first data structure identifying the first target warehouse and the item request 104. The first set of control instructions includes instructions for modifying inventory processing data for sending 300 boxes of chocolate cereal from the first target warehouse to the entity.

A second set of control instructions is generated within a second data structure identifying the second target warehouse and the item request 104. The second set of control instructions includes instructions for modifying inventory processing data for sending 400 boxes of chocolate cereal from the second target warehouse to the entity.

A third set of control instructions is generated within a third data structure identifying the third target warehouse and the item request 104. The third set of control instructions includes instructions for modifying inventory processing data for sending 100 boxes of chocolate cereal from the third target warehouse to the entity.

In this way, the data structures are transmitted to remote computers, associated with the target warehouses, for executing the sets of control instructions to cause the remote computers to modify inventory processing data structures for satisfying the item request 104, at 210. Sending the data structures includes transmitting the data structures via a network communication over a network to the remote computers.

Figure 5:
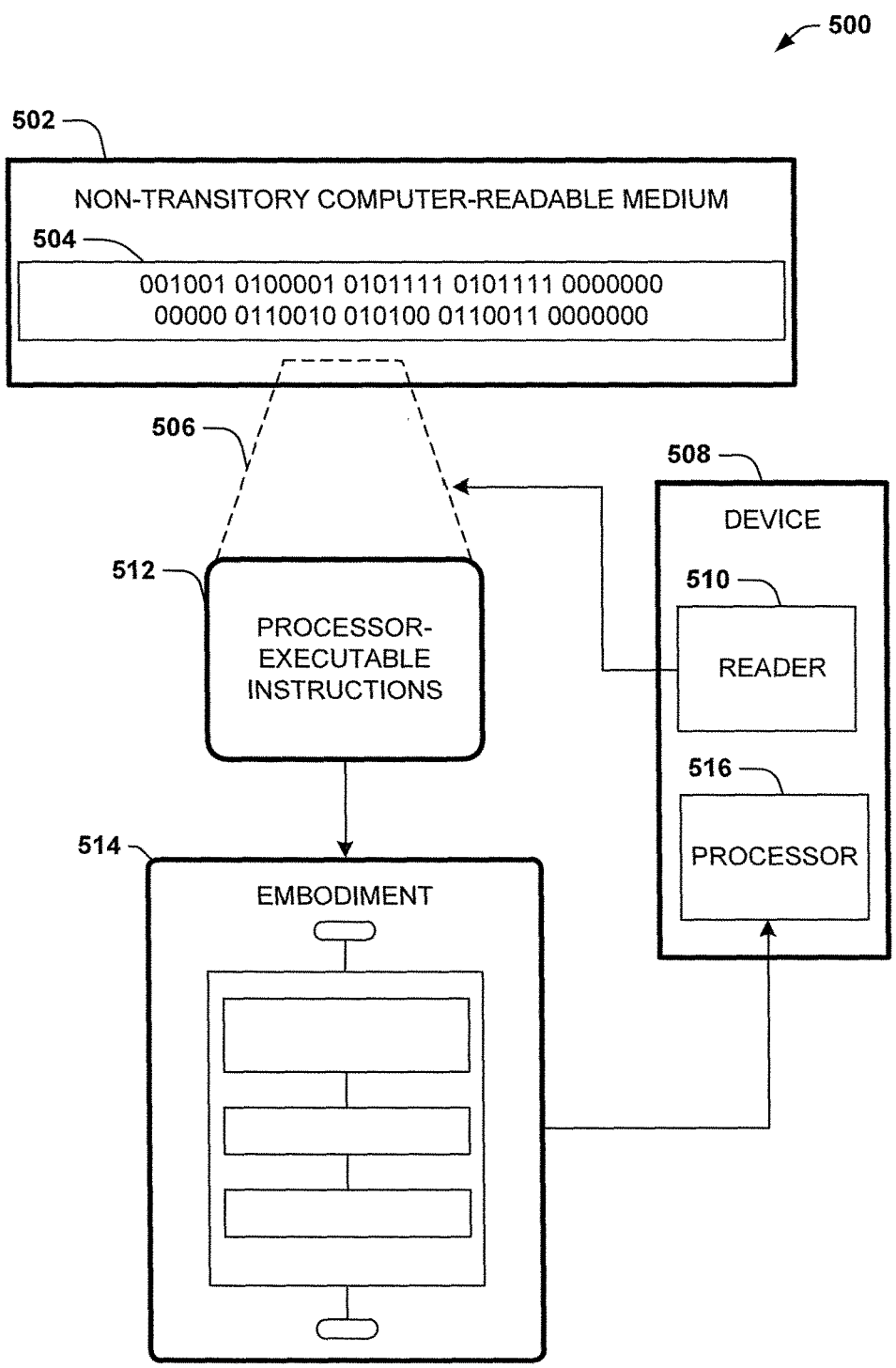
FIG. 5 illustrates an embodiment of a non-transitory computer-readable medium.

FIG. 5 is an illustration of a scenario 500 involving an example non-transitory computer-readable medium 502. In one embodiment, one or more of the components described herein are configured as program modules, such as the analysis module 106, stored in the non-transitory computer-readable medium 502. The program modules are configured with stored instructions, such as processor-executable instructions 512, that when executed by at least a processor, such as processor 516, cause the computing device to perform the corresponding function(s) as described herein. The non-transitory computer-readable medium 502 includes the processor-executable instructions 512 that when executed by a processor 516 cause performance of at least some of the provisions herein.

The non-transitory computer-readable medium 502 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 502 stores computer-readable data 504 that, when subjected to reading 506 by a reader 510 of a device 508 (e.g., a read head of a hard disk drive, or a read operation invoked on a solid-state storage device), express the processor-executable instructions 512. In some embodiments, the processor-executable instructions 512, when executed cause performance of operations, such as at least some of the example method 200 of FIG. 2, for example. In some embodiments, the processor-executable instructions 512 are configured to cause implementation of a system, such as at least some of the example system 100 of FIG. 1, for example.

FIG. 6 illustrates an example computing device that is configured and/or programmed with one or more of the example systems and methods described herein, and/or equivalents. The example computing device is a computer 606 that includes a processor 608, a memory 614, and I/O ports 618 connected by operation to a bus 610. In one example, the computer 606 includes logic of the analysis module 106 configured to facilitate the system 100 and/or the method 200 shown in FIGS. 1 and 2. In different examples, the logic of the analysis module 106 is implemented in hardware, a non-transitory computer-readable medium 502 with stored instructions, firmware, and/or combinations thereof. While the logic of the analysis module 106 is illustrated as a hardware component attached to the bus 610, it is to be appreciated that in other embodiments, the logic of the analysis module 106 could be implemented in the processor 608, stored in memory 614, or stored in disk 624.

In one embodiment, logic of the analysis module 106 or the computer 606 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 606 as data 604 that are temporarily stored in memory 614 and then executed by processor 608.

The logic of the analysis module 106 may also provide means (e.g., hardware, non-transitory computer-readable medium 502 that stores executable instructions, firmware) for performing rule based source sequencing for allocation.

Generally describing an example configuration of the computer 606, the processor 608 may be a variety of various processors including dual microprocessor and other multi-processor architectures. The memory 614 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 624 may be connected by operation to the computer 606 via, for example, the I/O interface 616 (e.g., card, device) and the I/O ports 618. The disks 624 may be, for example, a magnetic disk drive, a solid state disk drive, a floppy disk drive, a tape drive, a Zip drive, a flash memory card, a memory stick, and so on. Furthermore, the disks 624 may be a CD-ROM drive, a CD-R drive, a CD-RW drive, a DVD ROM, and so on. The memory 614 can store a process 602 and/or a data 604, for example. The disk 624 and/or the memory 614 can store an operating system that controls and allocates resources of the computer 606.

The computer 606 may interact with input/output (I/O) devices via the I/O interfaces 616 and the I/O ports 618. The I/O devices may be, for example, a keyboard, a microphone, a pointing and selection device, cameras, video cards, displays, the disks 624, the network devices 620, and so on. The I/O ports 618 may include, for example, serial ports, parallel ports, and USB ports.

The computer 606 can operate in a network environment and thus may be connected to the network devices 620 via the I/O interfaces 616, and/or the I/O ports 618. Through the network devices 620, the computer 606 may interact with a network. Through the network, the computer 606 may be logically connected to remote computers, such as the remote computer 120 associated with the warehouse (7), the remote computer 122 associated with the warehouse (5), and/or the remote computer 124 associated with the warehouse (15). Networks with which the computer 606 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into a single one. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a matter of consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be connected by operation to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
receive an item request from an entity;
analyze warehouse data records associated with a plurality of warehouses, capable of sourcing an item of the item request, to identify attributes of the plurality of warehouses;
wherein the processor identifies at least a business entity attribute and a distribution channel attribute associated to each warehouse from the warehouse data records;
execute rules of an allocation sequence rule set upon the attributes of the plurality of warehouses until a target warehouse is determined for satisfying the item request, wherein each rule comprises criteria for identifying the target warehouse by applying the criteria to values of the attributes to determine matches;
wherein the rules have assigned priorities and are executed in a sequential order based upon the priorities, wherein execution of the rules comprises:
(i) determining that a default primary warehouse cannot fulfill the item request, and executing a first rule, having a first priority, upon the attributes of the plurality of warehouses to determine one warehouse that has a business entity attribute that is associated with the entity and then the one warehouse is identified as the target warehouse; and
(ii) if the target warehouse is not identified by the first rule, then executing one or more additional rules of the allocation sequence rule set in the sequential order until the target warehouse is identified by executing a second rule that determines the one warehouse that includes a distribution channel attribute that matches a distribution channel of the entity and then identifies the one warehouse as the target warehouse;
generate a set of control instructions within a data structure identifying the target warehouse and the item request; and
transmit the data structure via network communications to a remote device associated with the target warehouse for causing the item request to be processed from the target warehouse.

2. The non-transitory computer-readable medium of claim 1, wherein the instructions for executing the first rule include instructions to cause the processor to:
utilize a criterion of the first set of criteria to evaluate the business entity attribute regarding whether warehouses and entities correspond to a same business entity or different business entities.

3. The non-transitory computer-readable medium of claim 1, wherein the instructions for executing the first rule include instructions to cause the processor to:
utilize a criterion of the second rule to evaluate the distribution channel attribute regarding whether warehouses and entities correspond to a same distribution channel or different distribution channels.

4. The non-transitory computer-readable medium of claim 1, wherein the instructions for executing the first rule include instructions to cause the processor to:
utilize a criterion of the first set of criteria to evaluate a protected attribute regarding whether warehouses have a protected status or an unprotected status.

5. The non-transitory computer-readable medium of claim 1, wherein the instructions for executing the first rule include instructions to cause the processor to:
utilize a criterion of the first set of criteria to evaluate a primary warehouse attribute regarding whether warehouses have a primary status or a non-primary status.

6. The non-transitory computer-readable medium of claim 1, wherein the instructions for executing the first rule include instructions to cause the processor to:
utilize a criterion of the first set of criteria to evaluate a proximity attribute of distances between warehouses and entities.

7. The non-transitory computer-readable medium of claim 1, wherein the instructions for executing the first rule include instructions to cause the processor to:
utilize a criterion of the first set of criteria to evaluate an item pricing attribute of items within warehouses.

8. The non-transitory computer-readable medium of claim 1, wherein the instructions for executing the first rule include instructions to cause the processor to:
utilize a criterion of the first set of criteria to evaluate a delivery timeframe attribute of estimated delivery times of shipping items from warehouses to entities.

9. The non-transitory computer-readable medium of claim 1, wherein the instructions for executing the first rule include instructions to cause the processor to:
utilize a criterion of the first set of criteria to evaluate a delivery cost attribute for shipping items from warehouses to entities.

10. The non-transitory computer-readable medium of claim 1, wherein the instructions for executing the first rule include instructions to cause the processor to:
utilize a criterion of the first set of criteria to a warehouse operational status attribute corresponding to abnormal operating states of warehouses.

11. The non-transitory computer-readable medium of claim 1, wherein the instructions to cause the processor to:
construct the allocation sequence rule set to comprise a first criterion used to evaluate a business entity attribute, a second criterion used to evaluate a distribution channel attribute, a third criterion used to evaluate a protected attribute, and a fourth criterion used to evaluate a primary warehouse attribute.

12. A computing system, comprising:
a processor connected to memory;
an analysis module stored on a non-transitory computer readable medium and configured with instructions that when executed by the processor cause the processor to:
receive an item request from an entity;
analyze warehouse data records associated with a plurality of warehouses, capable of sourcing an item of the item request, to identify attributes of the plurality of warehouses;
wherein the processor identifies at least a business entity attribute and a distribution channel attribute associated to each warehouse from the warehouse data records;
execute rules of an allocation sequence rule set upon the attributes of the plurality of warehouses until a target warehouse is determined for satisfying the item request, wherein each rule comprises criteria for identifying the target warehouse by applying the criteria to values of the attributes to determine matches;

wherein the rules have assigned priorities and are executed in a sequential order based upon the priorities, wherein execution of the rules comprises:
(i) determining that a default primary warehouse cannot fulfill the item request, and executing a first rule, having a first priority, upon the attributes of the plurality of warehouses to determine one warehouse that has a business entity attribute that is associated with the entity and then the one warehouse is identified as the target warehouse; and
(ii) if the target warehouse is not identified by the first rule, then executing one or more additional rules of the allocation sequence rule set in the sequential order until the target warehouse is identified by executing a second rule that determines the one warehouse that includes a distribution channel attribute that matches a distribution channel of the entity and then identifies the one warehouse as the target warehouse;

generate a set of control instructions within a data structure identifying the target warehouse and the item request; and transmit the data structure via network communications to a remote device associated with the target warehouse for causing the item request to be processed from the target warehouse.

13. The computing system of claim 12, the instructions to cause the processor to:
construct the allocation sequence rule set to comprise a criterion used to evaluate the business entity attribute regarding whether warehouses and entities correspond to a same business entity or different business entities.

14. The computing system of claim 12, the instructions to cause the processor to:
construct the allocation sequence rule set to comprise a criterion used to evaluate the distribution channel attribute regarding whether warehouses and entities correspond to a same distribution channel or different distribution channels.

15. The computing system of claim 12, the instructions to cause the processor to:
construct the allocation sequence rule set to comprise a criterion used to evaluate a protected attribute regarding whether warehouses have a protected status or an unprotected status.

16. The computing system of claim 12, the instructions to cause the processor to:
construct the allocation sequence rule set to comprise a criterion used to evaluate a primary warehouse attribute regarding whether warehouses have a primary status or a non-primary status.

17. A computer-implemented method, the computer-implemented method involving a computing device comprising a processor, and the computer-implemented method comprising:
executing, on the processor, instructions that cause the computing device to perform operations that:
construct an allocation sequence rule set within a rule data structure, the allocation sequence rule set specifying instructions for selecting target warehouses to satisfy item requests based upon a plurality of criteria, wherein the construction of the allocation sequence rule set comprises:
defining a first criterion used to evaluate a business entity attribute regarding whether warehouses and entities correspond to a same business entity or different business entities;
defining a second criterion used to evaluate a distribution channel attribute regarding whether warehouses and entities correspond to a same distribution channel or different distribution channels;
defining a third criterion used to evaluate a protected attribute regarding whether warehouses have a protected status or an unprotected status;
defining a fourth criterion used to evaluate a primary warehouse attribute regarding whether warehouses have a primary status or a non-primary status;
wherein each warehouse from a plurality of warehouses includes at least a business entity attribute, a distribution channel attribute, a protected status attribute, and a primary status attribute;

in response to receiving an item request for an entity, executing rules from the allocation sequence rule set in a sequential order comprising:
(i) determining that a default primary warehouse cannot fulfill the item request, and executing a first rule including the first criterion upon the attributes of the plurality of warehouses to determine one warehouse that has a business entity attribute that is associated with the entity and then the one warehouse is identified as the target warehouse; and
(ii) if the target warehouse is not identified by the first rule, then executing one or more additional rules of the allocation sequence rule set in the sequential order until the target warehouse is identified by executing a second rule based on the second criterion that determines the one warehouse that includes a distribution channel attribute that matches a distribution channel of the entity and then identifies the one warehouse as the target warehouse; and generating and transmitting control instructions via network communications to a remote device associated with the target warehouse for causing the item request to be processed from the target warehouse.

18. The computer-implemented method of claim 17, wherein the instructions cause the computing device to perform operations that:
define fifth criterion used to evaluate a delivery timeframe attribute of estimated delivery times of shipping items from warehouses to entities.

19. The computer-implemented method of claim 17, wherein the plurality of warehouses comprises a first virtual warehouse and a second virtual warehouse within a single warehouse.

* * * * *